United States Patent [19]

Rapp et al.

[11] Patent Number: 4,657,067
[45] Date of Patent: Apr. 14, 1987

[54] HYPEREUTECTIC DIRECT-CONTACT THERMAL STORAGE MATERIAL AND METHOD OF PRODUCTION THEREOF

[75] Inventors: Robert A. Rapp, Columbus; Carroll E. Mobley, Upper Arlington, both of Ohio

[73] Assignee: Ohio State University, Columbus, Ohio

[21] Appl. No.: 746,586

[22] Filed: Jun. 19, 1985

[51] Int. Cl.$^4$ ............................................. F28D 19/02
[52] U.S. Cl. ......................................... 165/1; 165/10; 165/104.15; 126/400; 126/436
[58] Field of Search ................... 165/1, 10 A, 104.15; 126/400, 436, 430

[56] References Cited

U.S. PATENT DOCUMENTS

| 2,257,878 | 10/1941 | Brennan . | |
|---|---|---|---|
| 2,644,799 | 7/1953 | Robinson | 252/71 |
| 2,808,494 | 10/1957 | Telkes . | |
| 3,029,596 | 4/1962 | Hanold et al. . | |
| 4,187,189 | 2/1980 | Telkes | 126/400 |
| 4,192,144 | 3/1980 | Pierce . | |
| 4,259,198 | 3/1981 | Kreibich et al. . | |
| 4,268,558 | 5/1981 | Boardman . | |
| 4,286,141 | 8/1981 | MacCracken . | |
| 4,421,661 | 12/1983 | Claar et al. . | |

FOREIGN PATENT DOCUMENTS

| 2364413 | 4/1978 | France | 126/400 |
|---|---|---|---|
| 115935 | 7/1984 | Japan | 126/436 |
| 920349 | 4/1982 | U.S.S.R. | 165/10 A |

OTHER PUBLICATIONS

D. H. Kaelbe, E. H. Cirlin, and P. J. Dynes, "Crystalline Polymers as Heat Storage Materials in Passive Thermal Protection Systems", Polymer Engineering and Science, vol. 15, No. 9, Sep. 1975.

Primary Examiner—Albert W. Davis, Jr.
Attorney, Agent, or Firm—Emch, Schaffer, Schaub & Porcello Co.

[57] ABSTRACT

An improved particle, and process for producing particle, for use in the storage and retrieval of thermal energy is disclosed. The particle comprises a eutectic material core encapsulated within a high-melting, corrosion resistant material.

20 Claims, 6 Drawing Figures

SI-RICH BINARY ALLOY SYSTEMS

| Binary Alloy System | Eutectic Temperature (°C) | Eutectic Composition (wt % Si) |
|---|---|---|
| V-Si | 1420 | 95 |
| Ti-Si | 1330 | 78 |
| Cr-Si | 1320 | 75 |
| Fe-Si | 1208 | 58 |
| Mn-Si | 1142 | 50.5 |
| Be-Si | 1090 | 61 |
| As-Si | 1073 | 35.5 |
| Ca-Si | 1023 | 61.4 |
| Ba-Si | 1020 | 41 |
| Sr-Si | 1000 | 50 |
| Ni-Si | 966 | 38 |
| Mg-Si | 950 | 57 |
| Cu-Si | 802 | 15.8 |
| Li-Si | 650 | 71.8 |
| Al-Si | 577 | 12 |

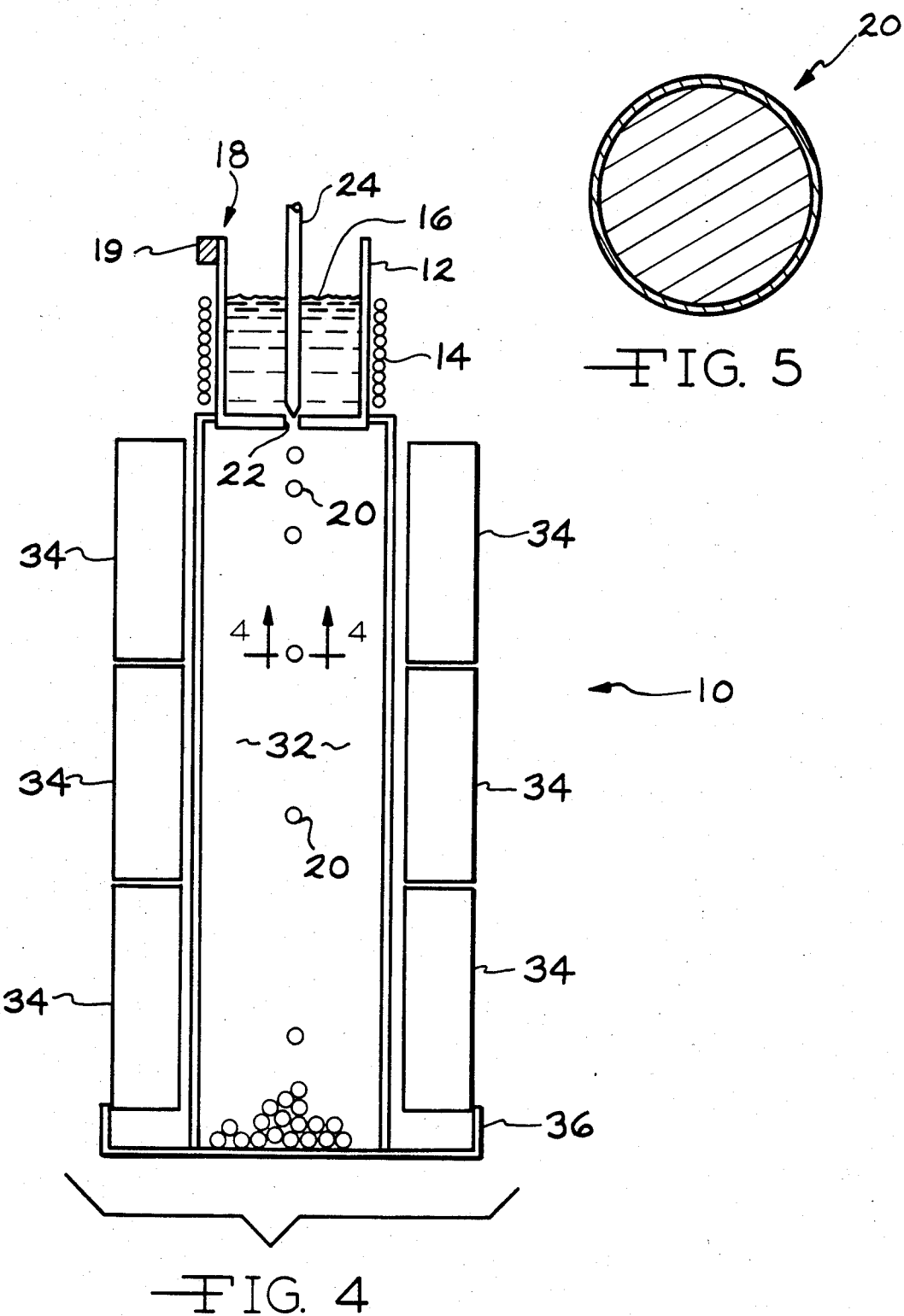

HYPEREUTECTIC DIRECT-CONTACT THERMAL STORAGE MATERIAL AND METHOD OF PRODUCTION THEREOF

BACKGROUND OF THE INVENTION

The present invention relates to an improved thermal energy storage material intended, among other uses, to provide an efficient phase change or eutectic material for use in storing thermal energy. Phase change or eutectic materials have shown potential for use as efficient heat storage systems, however, persistent technological and economic problems in the containment and use of the eutectic materials for heat storage have prevented the commercial adaptation of these materials to thermal energy storage. The phase change material of the present invention is designed to be brought into direct contact with hot or cool exchange fluids in a thermal energy storage system and eliminate the need for providing an elaborate containment system for the phase change material.

The industrial community has long been involved with the practice of heat storage for the purpose of conserving or transferring sensible heat energy without the use of a phase change. For example, steelmaking open-hearth furnaces are coupled with thermally insulated checkerworks of ceramic bricks which alternately are heated by hot combustion product gases and cooled by the air used in the combustion process. In this manner the sensible heat of the waste gases is used to preheat the combustion air. Such heat storage principles also have residential applications; many homes are heated at night by stored heat energy generated by the daytime sunshine.

The electric utility industry is currently in search of a method to efficiently store of heat for the purposes of "load-leveling"; that is, the efficient operation of power plants (nuclear, solar, coal- or oil-burning) at a constant rate around the clock such that the power plants store heat, or electrical energy, generated at night for use during the peak demand daytime hours. Improved efficiency in the 24-hour operation would provide a way to satisfy the peak demand without necessitating the construction of expensive new utility power plants. For instance, in the case of solar power plants the availability of heat from solar radiation can be extended through a period of darkness by an efficient phase change heat storage material.

Further, in various industrial plants involved with the production, processing or fabrication of metals, ceramics or glass, etc., at elevated temperatures, a need exists to minimize the heat lost from the hot process gases. Such plants design processes to transfer the heat in hot process gases to a cool medium requiring heating, e.g., the air needed for the combustion system. A heat storage intermediary material such as the hypereutectic material of the present invention, has the potential of direct applicability to these processes.

Current state-of-the-art high temperature heat energy storage commonly involves the cyclical process of melting a eutectic material having a high latent heat-of-fusion during the storage half of the cycle and liberating the latent heat-of-fusion upon solidification of the eutectic material during the utilization half cycle. Problems are encountered when the eutectic material experiences such cyclic melting and solidification. The volume change associated with the cyclic phase change often causes damage to the eutectic material or its containment structure. In addition, the eutectic material is often corrosive to the heat exchanger material, as are the hot gases, fluids, or condensates resulting from various combustion processes or heat sources. Thus, containment of the eutectic material in a heat exchanger insensitive to corrosion and unaffected by volume changes generally represents a difficult and expensive problem in the design of phase change heat storage systems which has not yet been solved.

Previous investigations have considered the storage of heat energy using the latent heat-of-fusion of particular materials. Generally, in such concepts, the eutectic material would be contained in corrosion-resistant tubes. The entire eutectic material within the tube would undergo fusion and freezing upon each heat storage cycle. In such a system, the phase change material is contained within the tubes and is isolated from direct contact with the working fluids. In some prior art systems the eutectic material directly contacts the working fluids. For example, U.S. Pat. No. 4,192,144 shows the use of pebbles as a direct contact heat storage medium. The pebbles comprise nonmetallic shells of, for example, silica, alumina or graphite, which cover or enclose a eutectic salt material. Other prior art systems, for instance, U.S. Pat. No. 4,421,661, show a eutectic material which is retained within a porous solid support-structure material which itself is capable of storing only sensible heat.

The heat storage materials often accepted for use in such heat storage systems are eutectic compositions of multi-component fused salts, such as nitrates, carbonates, and halides. These materials may cause severe corrosion damage to the heat exchanger structure. In order to overcome the drawbacks normally associated with the use of salt eutectic materials, Birchenall and Riechman, *Metall. Trans.*, 11A 1415 (1980) surveyed the heat storage potential of metallic eutectic materials, clarified the thermodynamic factors important to their storage of heat, and measured the heat storage capacity for a number of high-temperature binary and ternary metallic eutectic alloys. Several eutectic alloys showed promise: the binary Al-Si eutectic alloy (570 J/gm at 577° C. (850 K.) for 12.6 wt. percent Si) and the ternary Al-Si-Mg eutectic alloy (550 J/gm at 506° C. (779 K.) for 13.3 wt. percent Si, 4.6 wt. percent Mg). These alloy eutectic materials could be favored over eutectic salt materials, with the proper methods of containment and utilization. The alloy eutectics have a large range of transformation temperatures, comparatively low vapor pressures, and exhibit a high thermal conductivity. Therefore, less time or less heat exchanger surface would be required to melt or solidify the alloy eutectic materials.

However, the commercial containment of these eutectic phase change materials would require a heat exchanger having expensive corrosion resistant tubing. Currently, the development of high-temperature heat storage systems incorporating metallic eutectic material has been stifled by the lack of economic, efficient containment devices.

Therefore, there is currently a need for the selection and design of a system for storing thermal energy that utilizes either salt or alloy phase change materials that can withstand direct contact with hot, corrosive environments.

There is a further need for the development of an improved material and method for storing thermal energy which take advantage of the desirable characteristics of the eutectic alloy materials.

The object of this invention is to provide a simple and inexpensive self-contained, direct contact phase change heat storage material.

It is a further object of the invention to provide a phase change material having generally a spherical shape that can be maintained in a container such that the phase change material can be brought into direct contact with the hot corrosive fluids in, for example, a ceramic lined tower, without the need for expensive and difficult containment.

In addition, it is an object of the present invention to provide a heat storage shot having a unique gross composition and processes for producing such shot so that a relatively high melting, corrosion resistant outer shell encloses and contains a lower melting, heat storing eutectic core of an optimized composition.

SUMMARY OF THE INVENTION

A hypereutectic direct-contact heat storage material for use in a system designed to store and retrieve thermal energy and methods for producing the thermal energy storage material are disclosed. The thermal energy is stored in a natural composite latent heat storage material utilizing the heat-of-fusion of eutectic materials such as Al-Si or Al-Si-Mg alloys or fused salts. The thermal energy storage material is formed into generally spherical shapes or shot which have an outer shell and an inner core. The outer shell is formed of a corrosion-resistant material having a higher melting point than the material of the inner eutectic core. The inner core material is a lower melting, heat storing eutectic material.

The thermal energy storage material is produced by heating a gross composition of a phase change material wherein a high-melting material is present in the gross composition in an amount greater than in the eutectic material. Such a composition is commonly referred to as a hypereutectic composition. The hypereutective composition is heated to a fully liquid state from which droplets or shots of the material are formed. The droplets are slowly cooled such that the high-melting material solidifies first and forms an outer shell around the lower-melting, inner eutectic core material. The inner eutectic core material, encapsulated within the outer shell, has an optimal composition with a high latent heat of fusion and is, therefore, an efficient heat storage material.

One system practicing the present invention can utilize a gross hypereutectic composition in the range of 25–50 wt % Si and the balance Al. For the purposes of discussion, an example having composition 27 wt. percent Si and the balance Al, with a liquidus temperature of 800° C. is presented. The gross Al-Si composition is heated to approximately 900° C. The liquid alloy Al-Si composition is cooled from 900° C. using a shotmaking process so that a spherical shot having a desired outside diameter is produced. The shotmaking process generally involves the controlled release of the liquid alloy through an orifice into a reservoir of a warm quench medium such as a fused salt, glass, slag, oil or organic liquid. The quench medium and the other process variables are chosen such that the surface tension forces stabilize a spherical shot of the liquid alloy. The shot is slowly cooled by the warm quench medium. Upon the controlled cooling of the Al-27 Si alloy shot, a first solid layer of nearly pure silicon begins to form at approximately 800° C. (1073 K.) as a spherical shell when the liquid alloy shot cools in contact with the quench medium. As heat energy is further withdrawn slowly from the shot, the crust or shell of the nearly pure solid silicon thickens. In this way, the inner eutectic core material is encapsulated within the outer high-melting shell. Finally, according to a quasi-equilibrium freezing process, at 577° C. (850 K.) for the Al-Si system, the liquid core with the eutectic composition solidifies isothermally within the solid silicon case and releases a large latent heat of solidification. Further, the solid shell also encloses the solidification shrinkage volume of the eutectic core.

Other advantages and features of the invention will be apparent from the following desciption and drawings relating to the preferred embodiment.

BRIEF DESCRIPTION OF THE DRAWINGS

FIG. 4 is a schematic diagram of one embodiment of a shotmaking apparatus.

FIG. 5 is a schematic drawing of solidified composite heat storage shot.

DESCRIPTION OF THE PREFERRED EMBODIMENT

A number of binary metal-silicon systems exhibit eutectic reactions with eutectic temperatures for heat storage over the range from 577 C. (with the Al-Si system) to 1420 C. (with the V-Si system). A listing of example binary metal-silicon alloy systems and their respective eutectic temperatures and compositions is given in FIG. 1. Hypereutectic alloys in these binary systems are anticipated to have relatively large heats of fusion and may be processed to obtain silicon or silicide-encased shot having an inner core of the cited eutectic compositions. Example binary alloys which are relatively inexpensive and exhibit good heat storage characteristics include the Al-Si, Cu-Si, Ni-Si, Fe-Si, and Mg-Si hypereutectic alloys.

The number of potential hypereutectic heat storage alloys becomes larger based on the usage of ternary and higher order alloy systems which could provide a primary silicon or silicide shell encapsulating secondary and ternary compounds and eutectics exhibiting high heats of fusion. Thus, this invention is readily extendable to alloys containing more than two elements. A particular attractive example of a ternary hypereutectic material with a high heat storage capacity is the Fe-Si-C system.

Figure 2:
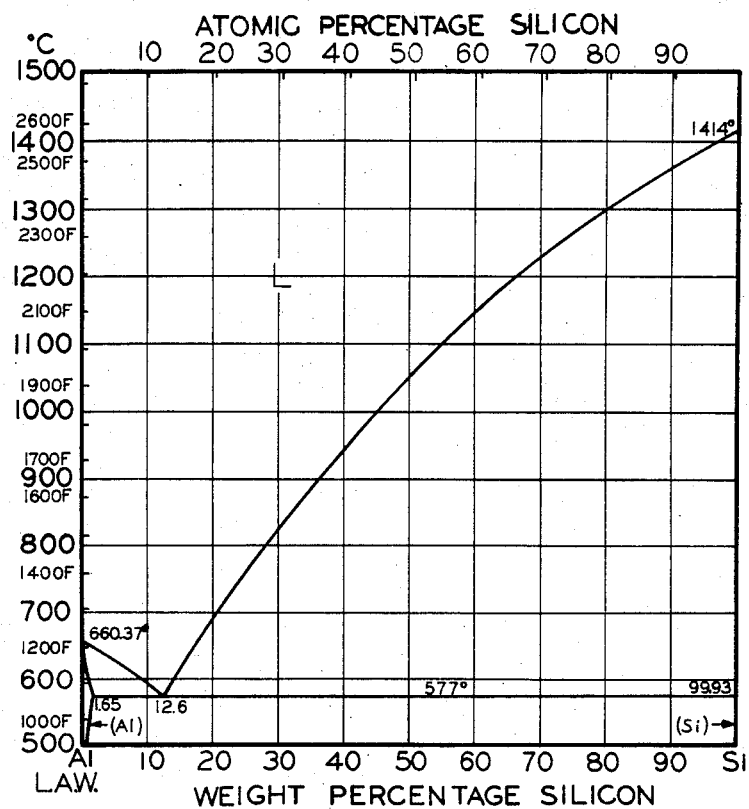
FIG. 2 is a binary phase diagram for an aluminum-silicon eutectic material.

Again, for the purpose of discussing the preferred embodiment of the present invention, a hypereutectic Al-Si alloy will be presented. Referring now to FIG. 2, the binary phase diagram for the Al-Si eutectic alloy is shown. The Al-Si eutectic material is capable of storing heat energy at the eutectic temperature of 577° C. (850 K.).

The casting of a generally spherical shot having appropriate macro and microstructural morphologies for the heat storage system of the present invention requires use of a shotmaking system which incorporates a controlled quenching system. The hypereutectic heat storage material is formed from an alloy having a desired composition. For the example shown, the candidate alloy material has a gross silicon composition of approximately 27 percent, by weight of the alloy, with the balance being aluminum.

Referring now to FIG. 4, a shotmaking system 10 is shown. The shotmaking system 10 includes an inert refractory crucible assembly 12 made of, for example, graphite which holds a quantity of the alloy material 16. The crucible assembly is operatively connected to a means 14 for melting an alloy material 16, such as an electric induction heating coil. The alloy material 16 is melted and contained in the crucible assembly 12. The crucible assembly 12 includes a means 18 for creating droplets or shot 20 of the liquid alloy material such that the shot 20 have a predetermined outside diameter. In the embodiment shown in FIG. 4, the shotmaking means 18 contains one or more orifices 22 with slide gates or stopper rods 24 of other means for the controlled release of the liquid alloy from the crucible assembly 12. The orifice size and the extent of opening of the orifice control the size of the resulting liquid shot 20. The imposition of a controlled impact from a transducer 19 also controls the size of the resulting liquid shot 20. The temperature of the liquid alloy material 16 is monitored using thermocouples (not shown) and controlled by the adjustment of the heating means 14.

The crucible assembly 12 is operatively connected to a controlled thermal gradient quenching chamber 30 for containing and cooling the free falling shot 20. The quenching chamber 30, for the example shown, consists of a 12.7 to 15.2 centimeter (5 to 6 inch) diameter, approximately 6 foot long steel tube or pipe which contains a preselected quench medium 32, such as a fused salt, glass, slag, oil or organic liquid. A segmented heating system 34 is operatively connected to the quenching chamber 30 to control the temperature profile of the quench medium 32. By controlling the temperature distribution within the quenching chamber 30 it is possible to nucleate and grow the primary silicon as an integral surface layer on each shot 20. A collection basin 36 for collecting the solidified shot is located in the lower region of the quenching chamber 30. The quenching chamber basin 30 is instrumented to allow measurement of the temperature of the solidified or partially solidified shot 20.

For the Al-27 Si composition formed by the above-described shotmaking assembly 10, the solid silicon shell accounts for 16.5 wt. percent of the shot with the balance of the shot being a core of 83.5 wt. percent Al-Si of the eutectic composition. Using room-temperature densities for silicon and aluminum (as the first approximation) these proportions correspond to a silicon shell of 6.6% of the shot radius (regardless of the actual radius) and 93.4% of the shot radius for the eutectic core as shown in FIG. 5. These proportions are changeable by choosing a different gross composition of the alloy material.

Figures 1, 6:
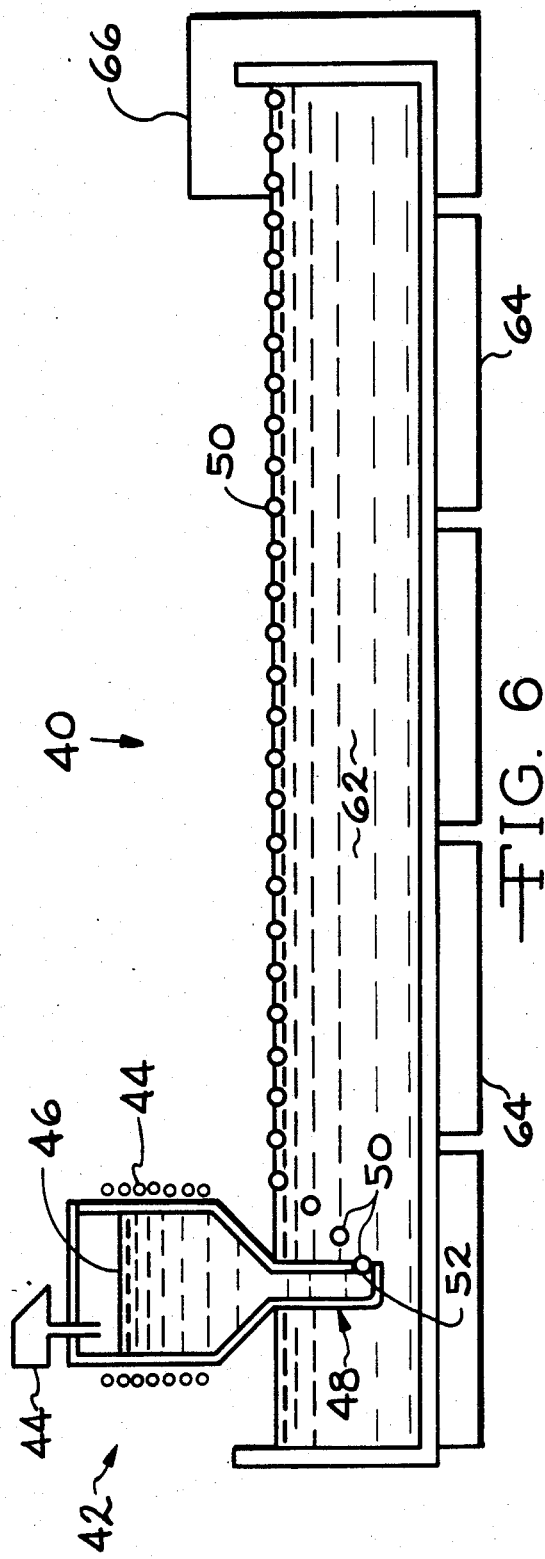
FIG. 1 is a table listing a variety of binary metal-silicon alloy systems and their respective eutectic temperatures and compositions.
FIG. 6 is a schematic drawing of an alternative embodiment of a shotmaking apparatus.

Referring now to FIG. 6, another embodiment of a shotmaking system 40 is shown. The shotmaking system 40 includes a crucible assembly 42 which holds a quantity of candidate alloy material 46. The crucible assembly is operatively connected to a means 44 for melting the alloy material 46. The alloy material 46 is melted and contained in the crucible assembly 42. The crucible assembly 42 includes a means 48 for creating droplets or shot 50 of the liquid alloy material 16 such that the shot 20 have a predetermined outside diameter. In the embodiment shown in FIG. 6, the shotmaking means 48 includes an orifice 52 through which a predetermined amount of liquid alloy material 46 is released. The shotmaking means 48 includes means 54 for causing a predetermined amount of the liquid alloy material 46 to be delivered through the orifice 52. As one example, an inert gas can be utilized to provide the force to the liquid alloy material. The crucible assembly 12 and the shotmaking means 48 are operatively connected to a controlled thermal gradient quenching chamber 60 for containing and cooling the shot. The quenching chamber 60 contains a preselected quench medium 62, which has a density slightly higher than the density of the liquid alloy material 46. The shot 50 is released into the quench medium 62 and floats to the surface. A portion of the shot 50 is exposed to a cooling outside environment such that slow solidification of the shot 50 occurs to form an outer shell which encapsulates an inner core material. A heating system 64 is operatively connected to the quenching chamber 60 in order to control the temperature profile within the quench medium 62. In a preferred embodiment, the temperature of the quench medium 62 is highest near the crucible assembly 42 and the temperature of the quench medium decreases as the distance from the crucible assembly 42 increases. By controlling the temperature distribution within the quenching chamber 60, it is possible to form a shot having a substantially uniform outer shell encapsulating an inner eutectic core material. A basin 66 for collecting the shot 50 is operatively connected to the quenching chamber 60. The quenching chamber 60 is instrumented to allow measurement of the temperature of the solidified or partially solidified shot 50.

The Al-27 Si hypereutectic shot can be used as the heat storage material for a fixed or fluidized bed having an inexpensive ceramic-lined column. The temperature might typically be cycled between about 650° and 500° C., i.e., about 75° C. above and below the eutectic temperature of the Al-Si material. For the Si-encased shot example described above the solid Si shell constitutes approximately 0.81% of the shot radius at 650° C., and contains the liquid core. Depending upon the specific height and weight of the bed and the warm (creep) strength of silicon, the solid shell and liquid core supports the compressive stresses imposed by the weight of the shot in the column. Further, silicon metal is extremely resistant to high-temperature oxidation and sulfidation so that environmental degradation is not expected in air or hot combustion product gases. Silicon is a favorable heat storage alloy component because it has a high entropy of fusion, is very corrosion resistant at high temperatures, is readily available at a modest price, exhibits a large negative solidification shrinkage and displays adequate creep strength. In addition, silicon has a low solid solubility for other alloy components which might reduce its corrosion resistance.

Figure 3:
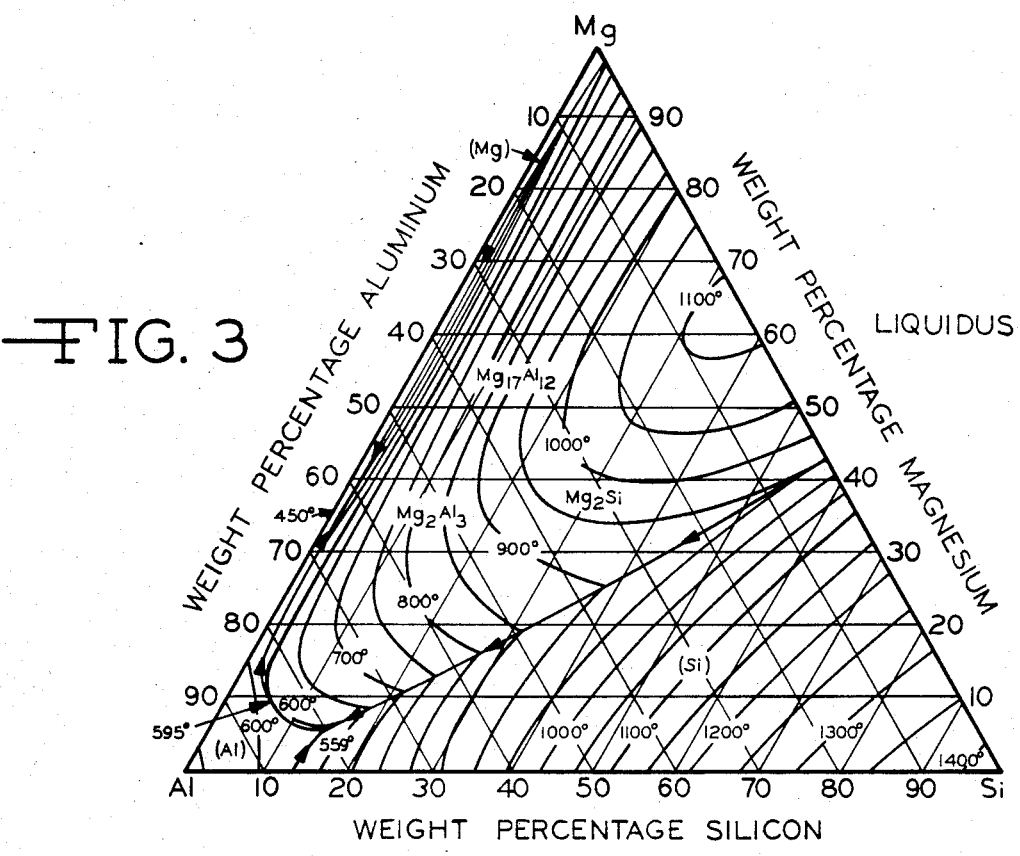
FIG. 3 is a ternary phase diagram for an aluminum-silicon-magnesium material.

The selection of a hypereutectic composition of the present invention offers the opportunity to form a corrosion-resistant, creep-resistant, higher-melting shell around a lower-melting eutectic core. It should be understood that other multicomponent alloy compositions may also be used. Several factors which lead to an optimization of the inherent heat storage capacity for eutectic alloys include the increase in the number of components in the system and the formation of solid intermetallic compounds with highly negative enthalpies of formation. Hypereutectic compositions in the ternary Al-Si-Mg systems shown in FIG. 3 and certain quaternary alloys are also advantageous. For the Al-Si-Mg system it is possible to select a hypereutectic shot composition with excess silicon and magnesium, for example Al-30 Si-10 Mg, so that after forming a pure silicon case at 850° C. (1123 K.), a significant volume fraction of the very stable $Mg_2Si$ compound would also be formed along with the eutectic core, thereby increasing the heat storage capacity. It should be further understood that nonmetallic systems, such as fused salt systems may also be used. In particular, a very stable, high melting, inexpensive salt such as $CaF_2$ could represent an excellent case for a multicomponent eutectic salt core.

The accommodation of volume expansion by the hypereutectic shot occurs as follows: The solid silicon shell formed in the solidification of a hypereutectic heat storage shot exhibits about a 9.5% expansion upon solidification. Any such expansion of the shell upon solidifying the spherical shot can ideally accommodate the volume expansion upon the melting of the eutectic core during its service in cycling about the eutectic temperature. The Al-Si eutectic core exhibits a 4% solidification shrinkage. However, shrinkage voids resulting from the initial freezing of the eutectic material are maintained within the core, so that upon melting of the eutectic core in cyclic service, the voids are available to accomodate the melting expansion.

In addition, the compressive strength of liquid-filled solid shells is known. Spheres (even with a liquid core) enjoy outstanding compressive strength. If a fixed bed of heat storage spheres or shot did require additional mechanical support, this support could be achieved by ceramic supports in the heat storage system. Further, to relieve the compressive stresses of a fixed bed, or to provide a system with rapid cycling capability, smaller spherical shot can be used as a fluidized bed. Other pelletized heat exchange schemes are possible.

The hypereutectic heat storage shot of the present invention is useful for an improved heat storage for solar applications. The eutectic temperatures of the Al-Si eutectic alloy (570 J/gm at 577° C., 850 K.) for 12.6 wt. percent Si and the ternary Al-Si-Mg eutectic alloy (550 J/gm at 560° C., 833 K.) for 13.3 wt. percent Si, 4.6 percent Mg) generally match the temperature range for which solar heat is presently being absorbed at current state-of-the-art solar receiving systems used to generate electricity. For many of these systems solar heat is inefficiently stored as the sensible heat of an alkali nitrate salt for subsequent use in steam generation. The alkali nitrate heat transfer fluid used in a solar energy heat storage system has a 565° C.–594° C. maximum operating temperature and is an excellent medium to contact and exchange heat with the hypereutectic Al-Si or Al-Si-Mg heat storage shot.

In addition, the Al-Si-Mg shot of the present invention is appropriate for use in a direct water-steam system. The hypereutectic alloy shot have sufficient mechanical stability to support the bed and withstand the thermal shock of the water-to-steam conversion. Such a receiver and conversion system using hypereutectic shot is both smaller and easier to maintain than the conversion system based upon the usage of the alkali nitrate system.

The above detailed description of the present invention is given for explanatory purposes. It will be apparent to those skilled in the art that numerous changes and modifications can be made in the preferred embodiments of the invention described above without departing from the scope of the invention. Accordingly, the whole of the foregoing description is to be construed in an illustrative not in a limitative sense, the scope of the invention being defined solely by the appended claims.

We claim:

1. An improved particle for use in the storage and retrieval of thermal energy, said particle being formed from a phase change material having a generally spherical shape, said phase change material having a gross hypereutectic composition for a binary metal alloy containing silicon, wherein said particle has an outer shell of a relatively high-melting and corrosion resistant material, said outer shell of said phase change material comprising silicon, said outer shell enclosing and containing a lower melting, heat storing eutectic core of such binary metal composition containing silicon.

2. The improved particle of claim 1 wherein said phase change material comprises a V-Si alloy, wherein said Si accounts for approximately 97.5% by weight, of said V-Si alloy.

3. The improved particle of claim 1 wherein said phase change material comprises a Ti-Si alloy, wherein said Si accounts for approximately 89% by weight, of said Ti-Si alloy.

4. The improved particle of claim 1 wherein said phase change material comprises a Cr-Si alloy, wherein said Si accounts for approximately 88% by weight, of said Cr-Si alloy.

5. The improved particle of claim 1 wherein said phase change material comprises a Fe-Si alloy, wherein said Si accounts for approximately 80% by weight, of said Fe-Si alloy.

6. The improved particle of claim 1 wherein said phase change material comprises a Mn-Si alloy, wherein said Si accounts for approximately 72% by weight, of said Mn-Si alloy.

7. The improved particle of claim 1 wherein said phase change material comprises a Be-Si alloy, wherein said Si accounts for approximately 90% by weight, of said Be-Si alloy.

8. The improved particle of claim 1 wherein said phase change material comprises a As-Si alloy, wherein said Si accounts for approximately 60% by weight, of said As-Si alloy.

9. The improved particle of claim 1 wherein said phase change material comprises a Ca-Si alloy, wherein said Si accounts for approximately 80% by weight, of said Ca-Si alloy.

10. The improved particle of claim 1 wherein said phase change material comprises a Ba-Si alloy, wherein said Si accounts for approximately 70% by weight, of said Ba-Si alloy.

11. The improved particle of claim 1 wherein said phase change material comprises a Sr-Si alloy, wherein said Si accounts for approximately 70% by weight, of said Sr-Si alloy.

12. The improved particle of claim 1 wherein said phase change material comprises a Ni-Si alloy, wherein said Si accounts for approximately 60% by weight, of said Ni-Si alloy.

13. The improved particle of claim 1 wherein said phase change material comprises a Mg-Si alloy, wherein said Si accounts for approximately 80% by weight, of said Mg-Si alloy.

14. The improved particle of claim 1 wherein said phase change material comprises a Cu-Si alloy, wherein said Si accounts for approximately 45% by weight, of said Cu-Si alloy.

15. The improved particle of claim 1 wherein said phase change material comprises a Li-Si alloy, wherein said Si accounts for approximately 83% by weight, of said Li-Si alloy.

16. An improved particle for use in the storage and retrieval of thermal energy, said particle being formed from a phase change material having a generally spherical shape, said phase change material having a gross composition of Al and Si, wherein said particle has an outer shell of a relatively high-melting and corrosion-resistant material, said outer shell of said phase change material comprising silicon, said silicon outer shell enclosing and containing a lower-melting, heat-storing eutectic core of such Al-Si composition.

17. The improved particle of claim 16 wherein said phase change material comprises an Al-Si alloy, wherein said Si accounts for approximately 12%, by weight, of said Al-Si alloy.

18. An improved particle for use in the storage and retrieval of thermal energy, said particle being formed from a phase change material having a generally spherical shape, said phase change material having a gross composition of a ternary metal alloy containing silicon, wherein said particle has an outer shell of a relatively high-melting and corrosion-resistant material, said outer shell of said phase change material comprising silicon, said silicon outer shell enclosing and containing a lower melting heat storing eutectic core of an optimum ternary metal composition containing silicon.

19. The phase change material of claim 18 wherein said phase change material comprises an Al-Si-Mg alloy wherein said Si accounts for approximately 13%, by weight, of said alloy, and wherein Mg accounts for approximately 4.6%, by weight, of said alloy, the balance of said alloy being substantially Al.

20. An improved method for storing and retrieving thermal energy with a heat storage system having a bed of hypereutectic particles said particles being formed from said phase change material having a generally spherical shape, said phase change material having a gross composition selected from a group comprising a binary metal alloy containing silicon, or a ternary metal alloy containing silicon, wherein said particle has an outer shell of a relatively high-melting and corrosion-resistant material, said outer shell of said phase change material comprising silicon, said outer shell enclosing and containing a lower melting heat storing eutectic core of said gross composition selected from said group comprising said binary alloy containing silicon, or said ternary metal alloy containing silicon, said method comprising:

introducing a heat transfer fluid into said bed of said hypereutectic particles;

dispersing heat transfer fluid among said hypereutectic particles such that the thermal energy from said heat transfer fluid is transferred to said hypereutectic particles, whereby said hypereutectic particles store thermal energy from said heat transfer fluid.

* * * * *